May 23, 1939.                W. BARTOSCH                2,159,545
                              BEARING
                         Filed June 30, 1936
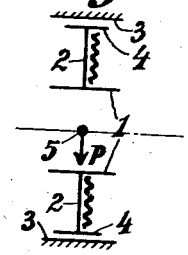
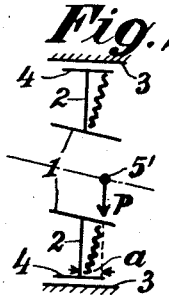
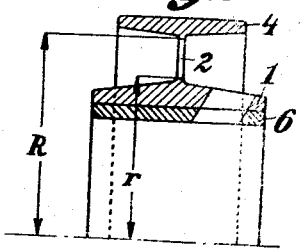
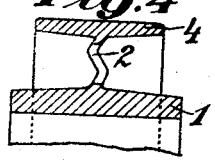
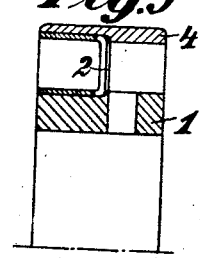
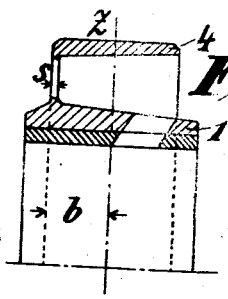
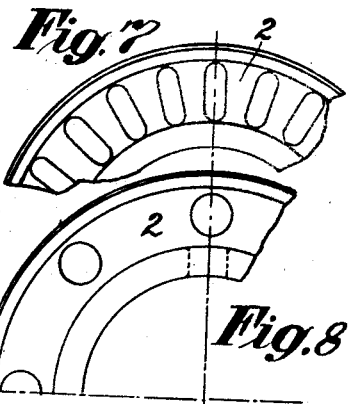
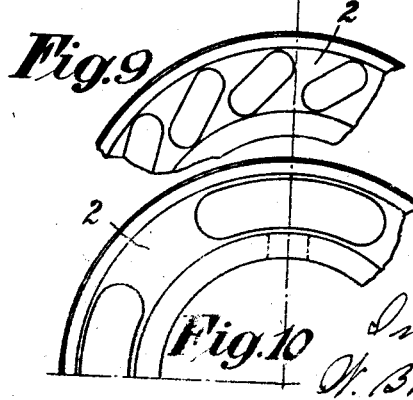
Inventor:
W. Bartosch
by E. F. Wenderoth
Atty Patented May 23, 1939

2,159,545

UNITED STATES PATENT OFFICE 2,159,545

BEARING

Wolfgang Bartosch, Vienna, Austria, assignor to the firm Carobronze Röhrenwerk Gesellschaft m. b. H., Vienna, Austria, a company of Austria Application June 30, 1936, Serial No. 88,229
In Austria July 17, 1935

9 Claims. (Cl. 308—26)

This invention relates to bearings of the ordinary type in which a revolving part, for instance a journal pin is in contact with a stationary part, for instance the cushion or lining of the bearing proper and in which a liquid lubricant is introduced and maintained between said two parts for reducing the friction between the contacting surfaces of said two parts of which the surface of the revolving part slides on the contacting surface of the other part. Such bearings will be referred to hereinafter as plain bearings as distinguished from ball or roller bearings in which a plurality of balls or rollers is interposed between and in contact with the adjacent surfaces of the revolving and the stationary part and roll in contact with both of them.

In plain bearings the revolving part, i. e. the journal pin or the shaft, is liable to assume under the action of gravity and other forces an oblique position relatively to the bearing proper that is to say an angle is liable to be set up between the geometrical axis of the journal pin and the geometrical axis of the bearing proper, wherefrom result various draw-backs. For avoiding the latter various constructions of such plain bearings have been proposed.

With this object in view the plain bearing operating with a liquid lubricant comprises an element supporting the revolving part such as the journal pin, an outer ring engaging into the bearing body and a yielding element connecting said element supporting the revolving part with said outer ring these constituent parts being so constructed and of such a nature that as long as the geometrical axis of the revolving part, such as the journal pin, is in the normal position, the pressure due to the load on the journal pin does not result in an appreciable radial displacement of the geometrical axis of the revolving part, but that whenever the geometrical axis of said revolving part becomes inclined to its normal position, the above mentioned yielding element permits the element supporting the revolving part to assume an inclination corresponding to the inclination of the journal pin before the film of the liquid lubricant between the revolving part and the element supporting it breaks, if desired, the support for the revolving part, the outer ring, and the yielding element connecting the two with each other may be made integral with each other and the material of the element supporting the revolving element may be so selected that it may also serve as the cushion or lining of the bearing, for instance a suitable special bronze may be used for this purpose.

A plain bearing constructed in accordance with the present invention is fully ready to be mounted in any desired machine or bearing body without requiring any adjustment, the costs of manufacturing the present bearing are comparatively low, it has a sufficient strength to withstand the normal radial strains and on the other hand it reliably prevents any undue strain on the film of the liquid lubricant between the revolving part and the element supporting it, in case the revolving part, for instance the journal pin becomes inclined, this latter feature is due to the fact that the yielding element undergoes a corresponding deformation or change in shape. Moreover the present invention permits to construct very short plain bearings showing comparatively low circumferential speeds.

The accompanying drawing, Figs. 1 to 2, illustrates by way of example and diagrammatically various constructional forms of the present slide bearing in axial section. Figs. 3 to 6 are similar views of certain details. Figs. 7 to 10 are front elevations of different constructional forms of the yielding element.

In the drawing 1 indicates the element supporting the revolving part not shown and 2 illustrates the yielding element by two lines, a straight one to indicate that this yielding element is of sufficient rigidity to take up the pressure exerted by the revolving part such as the journal pin on the element 1 supporting it, and a wavy line to indicate that the yielding element 2 is capable of deformation whenever the revolving part, such as the journal pin, becomes oblique, 4 indicates the outer ring and 3 the bearing supporting body, that is to say, that part of the machine or structure into which the bearing has to be mounted, 5 indicates the geometrical centre of the element 1 supporting the revolving part and at the same time the bearing point of the pressure P exerted by the revolving part on the element 1. In Fig. 1 it is assumed that the geometrical axis of the revolving part is in its normal position being parallel to or coinciding with the geometrical axis of the support 1 of the revolving part. In this case the yielding element 2 which may be simply in the shape of a plate or web connecting the element 1 with the ring 4, simply supports the revolving body, such as a journal pin, it having as already stated the strength required for this purpose and there being no tendency to impart any obliquity to the support 1.

The position of the parts illustrated in Fig. 2 is arrived at whenever the geometrical axis of the revolving part, as the journal pin becomes inclined under the action of any external forces, or such an oblique position of the geometrical axis of the revolving part may have existed beforehand. While, as seen from Fig. 1, the resultant P of the pressure exerted by the revolving part on its support 1 passes through the bearing point 5 which in the case illustrated in Fig. 1 is in the centre of the revolving part and its support 1, in the case illustrated by Fig. 2 this bearing point is in general shifted from its central position shown in Fig. 1 to another position namely towards the lowered end of the revolving part, say to 5' in Fig. 2, whereby a momentum or couple P.a is set up which results in a deformation of the yielding element 2 before an undue strain comes on the film of the lubricant and breaks this film. This is diagrammatically indicated in Fig. 2 by representing the capacity of yielding of the element 2 by a wavy line inclined to the straight line indicating the strength and stiffness. This yielding may take place within or beyond the limit of elasticity of the element 2. Owing to this deformation the supporting part follows the obliquity of the shaft and therefore this obliquity does not result in any injury to the film of the liquid lubricant nor in any biting of the revolving part into its support. The adjustment of the contacting surfaces begins whenever a momentum P.a is set up however small it may be and a new position of equilibrium is arrived at in counteraction to the reaction forces of the yielding element.

In the following a few examples of constructional forms of the invention will be set forth.

Fig. 3 is an axial section of a simple constructional form of a plain bearing embodying the present invention in which a cushion or lining 6 of a suitable material such as anti-friction metal is inserted into the supporting element of the revolving part, thus said support may be made of steel and the cushion or lining 6 may consist of bronze. Preferably the outer ring 4 snugly fits the bearing body. If the outer ring were liable to undergo a deformation under the action of the pressure exerted by the revolving part on its supporting element then this deformation would not be enhanced by any play between the outer ring and the bearing body. Consequently the outer ring may be made thinner when it fits snugly than when it has an appreciable play.

Fig. 4 is an axial section of another constructional form of the invention in which the elastic plate is corrugated in radial section. There may be one or more corrugations and the corrugations may extend over the entire plate or only over a part or parts of the same.

Fig. 5 shows by way of example another constructional form of the invention in which the yielding element is formed by the bottom 2 of an annulus U-shaped in transverse section. The yielding element being in this case formed by a separate body it may be made of another material than the other constituent parts of the bearing and more particularly of a material possessing properties especially suitable as regards strength and yielding capacity. The annulus may be connected with the support of the revolving element in any way as by welding, soldering, shrinking, pressing, or the like.

Fig. 6 illustrates by way of example in axial section another constructional form of the invention comprising a yielding element 2 in the form of an annulus U-shaped in transverse section, the bottom of which is, however, not in the plane of symmetry Z of the support of the revolving part.

In this constructional form which is particularly suitable for bearings running under low loads, the advantage is obtained that the pressure exerted by the revolving part or journal pin on its supporting element is transmitted to the outer ring 4 through the medium of the leverage b. Such bearings adjust themselves more readily than bearings having the web plate 2 in the plane of symmetry Z and therefore the constructional form just described is particularly suitable for bearings running under low loads.

Figs. 7, 8, 9 and 10 show front elevations of yielding elements in the form of annular plates and these plates are provided with openings differing in shape and distribution as may be required by the strength required. Of course the shape, size, and distributions of the openings may be varied as may be required by the conditions existing in any given case.

In the constructional form of the invention in which the annular plate or web 2 is used this annular plate is preferably so proportioned that its radial width, i. e., the difference between its outer radius R and its inner radius r is at least five times its average thickness (see Fig. 6). This rule offers the advantage of greatly simplifying the dimensioning of various sizes of the plate 2 and dispenses with the necessity of making preliminary trials for any given size.

As regards the construction of the annular plate 2 and the outer ring 4 either the selection of a suitable material or the selection of certain forms of transverse sections or the selection of both of these features may be mainly relied upon; in the majority of cases the last named combination will be resorted to. But the invention may also be carried into effect by making the three elements of the present bearing integral with each other of a suitable material such as a special bronze. It will depend on the special conditions of any given case whether the bearing will have to be constructed of a single material or of a plurality of materials and how the various parts have to be shaped and proportioned.

In the following two examples will be referred to:

1. Employment of steel bodies

Data:

Diameter of shaft_____ 50 millimeters
Number of revolutions_____ n=1500 per minute
Pressure exerted on the bearing_____ P=1000 kilogrammes
Obliquity of shaft_____ 1 : 500
Lubrication with circulation by means of machine oil of medium specific gravity.

The place required for the entire bearing should be approximately equal to that of a heavy single row ball bearing.

Owing to the lubrication with circulation there are favorable conditions for leading off the heat so that the comparatively slight transport of heat through the yielding element becomes unnoticed. The high pressure exerted on the bearing requires as compared to the obliquity of the bearing a certain transverse section of the yielding element which has to be determined on ground of the values supplied by experience. Advantageously the support of the revolving element is given here for securing a corresponding strength of its own a thickness of at least 6.5 millimeters. Together with the bronze lining of a thickness of 3.5 millimeters there results for instance a total thickness of 10 millimeters. Thereupon follows in a radial direction a web plate with a width of the web of for instance 12 millimeters which is connected to an outer flange of about 2.5 millimeters thickness. In the web plate there are provided for instance four bores, each of a diameter of 10 millimeters for obtaining the corresponding yielding capacity. The outer diameter of the bearing therefore amounts to $D = 50 + 2 \times 10 + 2 \times 12 + 2 \times 2.5 = 97$ millimeters. By calculation with the aid of experimental values obtained by measurement there results for instance that with the assumed obliquity of 1:500 a moment amounting to $P.a = 180$ centimeters-kilogrammes will be set up if the thickness of the web is 0.65 millimeters. The obliquity resulting from a shifting of the resultant of the pressure exerted on the bearing from the plane of symmetry of the bearing, the lever arm $a$ required for the obliquity is found by computing to be $180 : 1000 = 0.18$ centimeter $= 1.8$ millimeters. Therefore the distinctions of pressure in the case of the obliquity above given and load will not materially differ from the normal state, more particularly if one makes the length of the bearing greater than half the diameter of the revolving body say for instance 40 millimeters.

If the web plate were made thicker than 0.65 millimeter then for obtaining the same obliquity the resultant of the pressure exerted on the bearing would have to be shifted farther from the web. As this would result in a load increase of the strain it is better to carry the construction out on ground of the values just estimated.

2. Employment of light metal bodies

Data:

Diameter of shaft_____ 50 millimeters
Number of revolutions_____ $n = 1000$ per minute
Pressure exerted on the bearing _____ $P = 500$ kilogrammes
Obliquity of shaft_____ 1 : 300
The place required in the radial direction may be substantially left free but the outer diameter of the outer ring should not be more than 120 millimeters. In the axial direction the bearing should be built as compactly as possible, small weight. Lubrication by wick.

The way of calculating the dimensions is exactly the same as in Example 1. The liberty in the radial direction is advantageously utilised for providing a support as stiff as possible of the revolving body. For a bronze lining 3 millimeters thick, the thickness of the metal of the support of the revolving body may be made 10 millimeters if a light alloy has to be used. The thickness of the web plate is again found on ground of results of experience but is advantageously not greater than ⅕ of its radial width, because otherwise it would be unduly stiff. As in this case not only a very short length of the bearing is required but also a high obliquity, it will be necessary in order to avoid that the steel parts are very small and therefore very sensitive in transverse section to resort to a material having a lower degree of elasticity and hence for instance to a malleable light metal alloy having as high a tensile strength as possible. The degree of elasticity may be about one third of that of steel and results in a degree of deformation which is three times as great all other things being equal, or requires only ⅓ of the bending couple for the same degree of deformation. Besides the reduction of weight the use of light metal alloys offers the valuable advantage that a more efficient leading off of heat to the cooling surface of the casing is possible. This advantage is the more important as for want of a circulation lubrication which carries off heat, the latter is carried off partly by the web plate. In case of a good carrying off of heat the oil remains more viscose and this results in a better resisting film of the lubricant and hence in an increased reliability of operation.

The present bearing may also be so constructed in any suitable well known manner that it is capable of taking up axial pressures.

What I claim is:

1. A plain bearing comprising a non-rotatable inner sleeve for receiving a rotatable shaft or the like, a non-rotatable outer sleeve which may be inserted without adjustment in a casing and an intermediate annular yieldable metal member which is rigidly connected throughout its outer and inner circumferences to said inner sleeve and said outer sleeve, said yieldable member being sufficiently stiff to resist deformation in the case of pressures normal to the axis of the shaft but sufficiently deformable to enable said inner sleeve to take up an oblique position in the event of an oblique setting of the shaft before the breaking of the oil film therebetween.

2. A plain bearing comprising a non-rotatable member enclosing a rotatable shaft or the like, means spaced from said member adapted to be mounted fixedly in a casing, said member being reduced in thickness toward one of its ends and yieldable deformable metallic means connecting said member to said means spaced therefrom whereby said member may adjust itself to variations in the positioning of said shaft and maintain the oil film between said shaft and said member.

3. A plain bearing comprising a non-rotatable member enclosing a rotatable shaft or the like, means spaced from said member adapted to be mounted fixedly in a casing, and an annular yieldable deformable metallic web plate offset from the transverse plane of symmetry of said member connecting said member to said means spaced therefrom.

4. A plain bearing comprising a non-rotatable member enclosing a rotatable shaft or the like, means spaced from said member adapted to be mounted fixedly in a casing, and an annular yieldable deformable corrugated metallic web connecting said member to said means spaced therefrom.

5. A plain bearing for use with liquid lubrication, comprising a rigid inner sleeve for receiving a shaft, a rigid outer sleeve, which can be inserted without adjustment in the casing of an engine, both sleeves being closed, and an intermediate annular yieldable metal member, which is rigidly connected throughout its outer and inner circumference to said inner sleeve and to said outer sleeve, said yieldable member being sufficiently stiff to resist deformation in the case of pressures normal to the axis of the shaft, but sufficiently deformable to enable said inner sleeve to take up an oblique position in the event of an oblique setting of the shaft before the lubricant film breaks.

6. A plain bearing for use with liquid lubrication, comprising a rigid inner sleeve for receiving a shaft, a rigid outer sleeve, which can be inserted without adjustment in the casing of an engine, both sleeves being closed, and an intermediate annular yieldable metal member, comprising an annular plate perpendicular to the geometrical axis of the shaft, which is rigidly connected throughout its outer and inner circumference to said inner sleeve and to said outer sleeve, said yieldable member being sufficiently stiff to resist deformation in the case of pressures normal to the axis of the shaft, but sufficiently deformable to enable said inner sleeve to take up an oblique position in the event of an oblique setting of the shaft before the lubricant film breaks.

7. A plain bearing for use with liquid lubrication, comprising a rigid inner sleeve for receiving a shaft, a rigid outer sleeve, which can be inserted without adjustment in the casing of an engine, both sleeves being closed, and an intermediate annular yieldable metal member, which is rigidly connected throughout its outer and inner circumference to said inner sleeve and to said outer sleeve, said yieldable member being sufficiently stiff to resist deformation in the case of pressures normal to the axis of the shaft, but sufficiently deformable to enable said inner sleeve to take up an oblique position in the event of an oblique setting of the shaft before the lubricant film breaks, said rigid inner sleeve, said yieldable metal member and said rigid outer sleeve being made integral.

8. A bearing as set forth in claim 5 wherein the outer surface of said outer sleeve is designed to fit snugly corresponding to ball bearing tolerances within the supporting body so that an outer sleeve of relatively small bulk may be used.

9. A plain bearing for use with liquid lubrication, comprising a rigid inner sleeve for receiving a shaft, a rigid outer sleeve, which can be inserted without adjustment in the casing of an engine, both sleeves being closed, and an intermediate annular yieldable metal member, which is rigidly connected throughout its outer and inner circumference to said inner sleeve and to said outer sleeve, the annular width of said yieldable member being at least five times its average thickness whereby as long as the pressure exerted by said shaft on said member has its normal direction substantially no movement of the geometrical axis of said shaft with relation to the geometrical axis of said outer sleeve takes place but whenever the geometrical axes of said shaft and said outer sleeve become inclined relative to one another then the position of said member is changed to correspond, said yieldable member being also sufficiently stiff to resist deformation in the case of pressures normal to the axis of the shaft, but sufficiently deformable to enable said inner sleeve to take up an oblique position in the event of an oblique setting of the shaft before the lubricant film breaks.

WOLFGANG BARTOSCH.